US010170745B2

(12) United States Patent
Moon et al.

(10) Patent No.: US 10,170,745 B2
(45) Date of Patent: Jan. 1, 2019

(54) SECONDARY BATTERY

(71) Applicant: SAMSUNG SDI CO., LTD., Yongin-si, Gyeonggi-do (KR)

(72) Inventors: Young-Sik Moon, Yongin-si (KR); Sang-Won Byun, Yongin-si (KR)

(73) Assignee: Samsung SDI Co., Ltd., Yongin-si (KR)

(*) Notice: Subject to any disclaimer, the term of this patent is extended or adjusted under 35 U.S.C. 154(b) by 697 days.

(21) Appl. No.: 14/660,416

(22) Filed: Mar. 17, 2015

(65) Prior Publication Data
US 2015/0295220 A1 Oct. 15, 2015

(30) Foreign Application Priority Data

Apr. 15, 2014 (KR) .................. 10-2014-0044630

(51) Int. Cl.
H01M 2/34 (2006.01)
H01M 2/26 (2006.01)
H01M 2/30 (2006.01)
H01M 2/06 (2006.01)

(52) U.S. Cl.
CPC .............. H01M 2/34 (2013.01); H01M 2/26 (2013.01); H01M 2/30 (2013.01); H01M 2/06 (2013.01); H01M 2/348 (2013.01); H01M 2200/00 (2013.01); H01M 2200/10 (2013.01); H01M 2200/103 (2013.01); H01M 2200/20 (2013.01)

(58) Field of Classification Search
None
See application file for complete search history.

(56) References Cited

U.S. PATENT DOCUMENTS

| 9,741,997 | B2 * | 8/2017 | Lee ........................ H01M 2/348 |
| 2009/0320277 | A1 * | 12/2009 | Barrella .................. H01M 2/34 29/623.1 |
| 2011/0086258 | A1 * | 4/2011 | Yaginuma ............. H01M 2/263 429/160 |
| 2011/0177365 | A1 | 7/2011 | Yasui et al. |
| 2011/0177387 | A1 | 7/2011 | Byun et al. |

(Continued)

FOREIGN PATENT DOCUMENTS

| CN | 102867933 A | 1/2013 |
| EP | 0 570 590 A1 | 11/1993 |

(Continued)

OTHER PUBLICATIONS

JPO Office Action dated Nov. 27, 2017, corresponding to Japanese Patent Application No. 2014-012118 (7 pages).

(Continued)

Primary Examiner — Jeremiah R Smith
(74) Attorney, Agent, or Firm — Lewis Roca Rothgerber Christie LLP

(57) ABSTRACT

A secondary battery includes an electrode assembly including first and second non-coating portions; a first current collector connected to the first non-coating portion, and a second current collector connected to the second non-coating portion; and a cap assembly including a first terminal connection member connected to a portion of the first current collector, and a second terminal connection member connected to portion of the second current collector, and a terminal connection member of the first and second terminal connection members includes a fuse.

16 Claims, 6 Drawing Sheets

(56) References Cited

U.S. PATENT DOCUMENTS

| | | |
|---|---|---|
| 2011/0183165 A1 | 7/2011 | Byun et al. |
| 2011/0300419 A1 | 12/2011 | Byun |
| 2011/0305928 A1* | 12/2011 | Kim ................. H01M 2/34 429/61 |
| 2012/0103930 A1 | 5/2012 | Zhou et al. |
| 2012/0214030 A1 | 8/2012 | Guen |
| 2012/0225333 A1 | 9/2012 | Kim |
| 2013/0029191 A1 | 1/2013 | Byun et al. |
| 2013/0101870 A1 | 4/2013 | Byun et al. |
| 2013/0193763 A1* | 8/2013 | Zhao ................. E21F 17/06 307/65 |
| 2013/0196179 A1 | 8/2013 | Han et al. |
| 2013/0295445 A1 | 11/2013 | Byun |
| 2014/0159921 A1* | 6/2014 | Qualey ............. A61B 5/7445 340/870.09 |
| 2014/0170449 A1 | 6/2014 | Takahashi et al. |
| 2014/0315055 A1 | 10/2014 | Byun et al. |
| 2014/0377601 A1 | 12/2014 | Kim |
| 2015/0093612 A1* | 4/2015 | Okuno ............... H01G 11/74 429/61 |

FOREIGN PATENT DOCUMENTS

| | | |
|---|---|---|
| EP | 2 495 785 A1 | 9/2012 |
| EP | 2 515 363 A1 | 10/2012 |
| EP | 2 544 264 A1 | 1/2013 |
| EP | 2 579 357 A1 | 4/2013 |
| EP | 2 624 327 A1 | 8/2013 |
| EP | 2793295 A2 | 10/2014 |
| JP | 2013-20965 A | 1/2013 |
| KR | 2011-0133255 A | 12/2011 |
| KR | 10-2012-0052189 A | 5/2012 |
| KR | 10-2012-0099919 | 9/2012 |
| KR | 2013-0044965 A | 5/2013 |
| KR | 10-2014-0147351 A | 12/2014 |
| WO | WO 2012/164884 A1 | 12/2012 |

OTHER PUBLICATIONS

EPO Office Action dated Nov. 14, 2017, corresponding to European Patent Application No. 14150160.1 (5 pages).

EPO Search Report dated Nov. 4, 2014, corresponding to European Patent Application 14150160.1 (5 pages).

EPO Search Report dated Nov. 13, 2015, corresponding to European Patent Application 15185578.0 (8 pages).

KIPO Notice of Allowance dated Dec. 20, 2016, corresponding to Korean Patent Application No. 10-2013-0070438 (5 pages).

SIPO Office Action dated Jul. 17, 2017, corresponding to Chinese Patent Application No. 201410105634.3 (7 pages).

U.S. Office Action dated Nov. 5, 2015, issued in U.S. Appl. No. 14/091,257 (13 pages).

U.S. Final Office Action dated May 5, 2016, issued in U.S. Appl. No. 14/091,257 (13 pages).

U.S. Office Action dated Nov. 3, 2016, issued in U.S. Appl. No. 14/819,308 (8 pages).

U.S. Office Action dated Feb. 10, 2017, issued in U.S. Appl. No. 14/091,257 (15 pages).

U.S. Final Office Action dated Aug. 10, 2017, issued in U.S. Appl. No. 14/091,257 (24 pages).

U.S. Notice of Allowance dated Jul. 20, 2018, issued in U.S. Appl. No. 14/091,257 (8 pages).

* cited by examiner

SECONDARY BATTERY

CROSS-REFERENCE TO RELATED APPLICATION

This application claims priority to and the benefit of Korean Patent Application No 10-2014-0044630, filed on Apr. 15, 2014 in the Korean Intellectual Property Office, the entire content of which is incorporated herein by reference.

BACKGROUND

1. Field

Aspects of embodiments of the present invention relate to a secondary battery.

2. Description of the Related Art

In recent years, as electronics and communication industries have grown rapidly, portable electronic devices such as a camcorder, a cellular phone, and a notebook computer are coming into wide use. This has led to the increased use of a secondary battery. The secondary battery is being used for the portable electronic devices as well as medium and large-sized equipment, such as an electric tool requiring high output and high power, a vehicle, a boat, a space transportation system, a motorbike, a scooter, and an air transportation means.

Recently, a high-power secondary battery with high energy density using a non-aqueous electrolyte is being developed. The above-mentioned high-power secondary battery forms a high-capacity secondary battery by connecting a plurality of secondary batteries to each other so as to be used in driving a motor of a device requiring high power, such as an electric vehicle.

Such a secondary battery may have a cylindrical shape or a polygonal shape.

If a short circuit occurs in the secondary battery due to foreign matter of the like, an overcurrent flows in the secondary battery. The continuous flow of the overcurrent generates an excessive amount of heat in the secondary battery, and may cause the bursting and/or ignition of the secondary battery.

SUMMARY

According to an aspect of embodiments of the present invention, a secondary battery is configured having improved safety in the event of an overcurrent.

According to another aspect of embodiments of the present invention, a secondary battery includes a first terminal connection member having a fuse to allow the flow of a current to be rapidly interrupted in the event of a short circuit.

According to another aspect of embodiments of the present invention, a secondary battery includes a first current collector having a notch to enable bending and breaking.

According to another aspect of embodiments of the present invention, a secondary battery is configured having increased pressure of arc gas generated when there is a short circuit.

According to one or more embodiments of the present invention, a secondary battery includes: an electrode assembly including first and second non-coating portions; a first current collector connected to the first non-coating portion, and a second current collector connected to the second non-coating portion; and a cap assembly including a first terminal connection member connected to a portion of the first current collector, and a second terminal connection member connected to a portion of the second current collector, and a terminal connection member of the first and second terminal connection members includes a fuse.

The first terminal connection member may include a first area provided on an upper portion of the cap assembly, and a second area provided on a lower portion of the cap assembly.

A width of the second area may be narrower than a width of the first area.

The width of the second area may be 1 mm to 5 mm.

The fuse may be formed on the second area.

The secondary battery may further include a sealing member between the first current collector and the first terminal connection member, and a first hole may be formed at a position on the sealing member, and a first depression may be formed at a position on the first current collector corresponding to the first hole.

The first hole may be aligned with the first depression, and the second area may pass through the first hole and be connected to the first current collector in the first depression.

The first current collector and an end of the second area may be coupled to each other by laser welding.

The first terminal connection member may have a fastening bole between the first area and the second area.

The secondary battery may further include a sealing member between the first current collector and the first terminal connection member, and the sealing member may include a protrusion having a second hole, and a second depression may be formed at a position on the first current collector corresponding to the second hole.

The second hole may be aligned with the second depression, and the second area may pass through the second hole and be connected to the first current collector in the second depression, the protrusion of the sealing member being inserted into and coupled to the fastening hole.

A width of the second hole ay be greater than a width of the second area.

A gap between the second area and an inner surface of the protrusion defining the second hole may be 0.3 mm to 0.7 mm.

A height of the protrusion may be 3 mm to 7 mm.

The first terminal connection member may be a positive pole, and the second terminal connection member may be a negative pole.

A notch may be formed at a position on the first current collector.

A depth of the notch may be 0.3 mm to 0.7 mm.

As is apparent from the above description, a secondary battery according to one or more embodiments of the present invention includes the fuse provided on the first terminal connection member, thus preventing or substantially preventing the occurrence of an arc in the event of a short circuit and thereby improving safety.

Further, the secondary battery according to one or more embodiments of the present invention includes the notch formed at a position (e.g., a predetermined position) on the first current collector, thus being capable of rapidly and easily interrupting the flow of a current in the event of a short circuit.

BRIEF DESCRIPTION OF THE DRAWINGS

Some example embodiments of the present invention are described more fully hereinafter with reference to the accompanying drawings; however, the present invention may be embodied in different forms and should not be construed as limited to the embodiments set forth herein. Rather, the accompanying drawings, together with the specification, illustrate some example embodiments of the present invention, and serve to explain principles and aspects of the present invention.

In the drawing figures, dimensions may be exaggerated for clarity of illustration. Like reference numerals refer to like elements throughout.

DETAILED DESCRIPTION

In the following detailed description, certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive.

Aspects and features of embodiments of the present invention will be apparent from the following description of certain exemplary embodiments taken in connection with the accompanying drawings.

Hereinafter, the configuration of certain exemplary embodiments of the present invention will be described with reference to the accompanying drawings.

Figure 1:
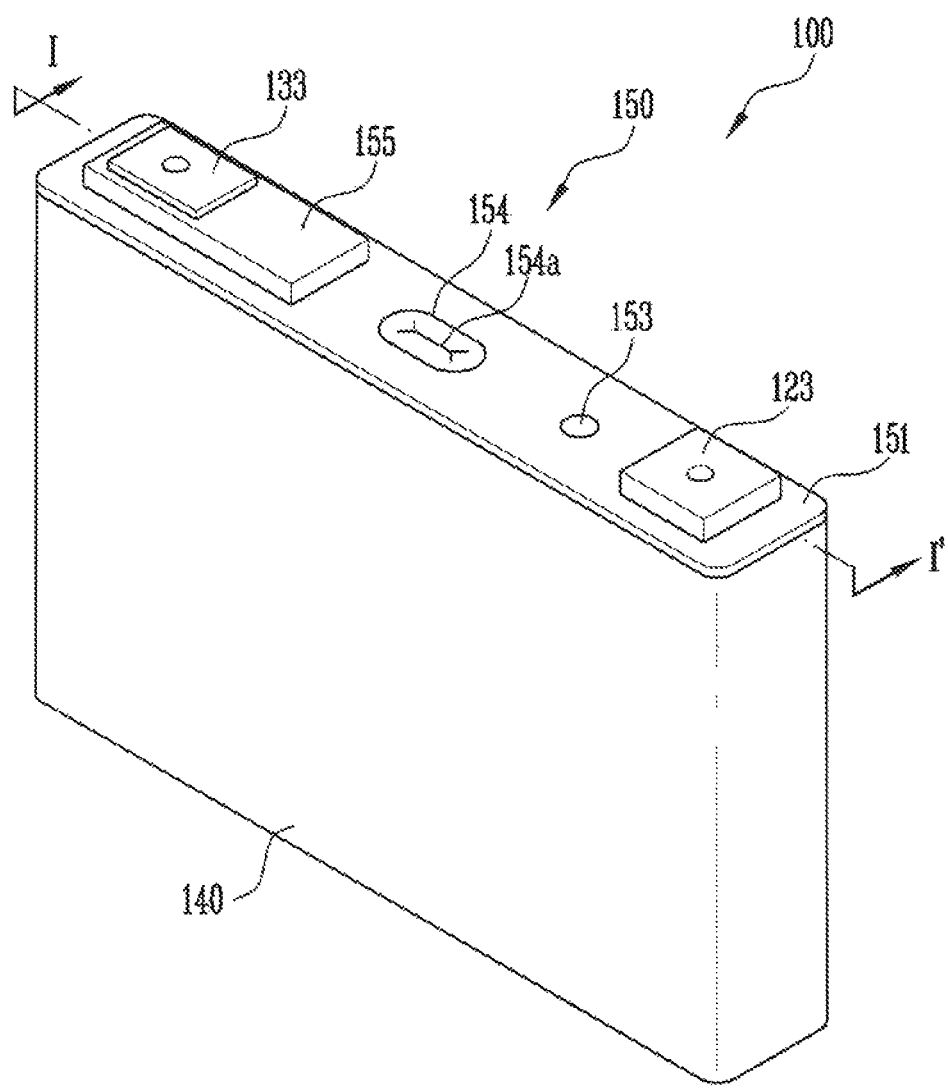
FIG. 1 is a perspective view of a secondary battery, according to embodiment of the present invention.
Figure 2:
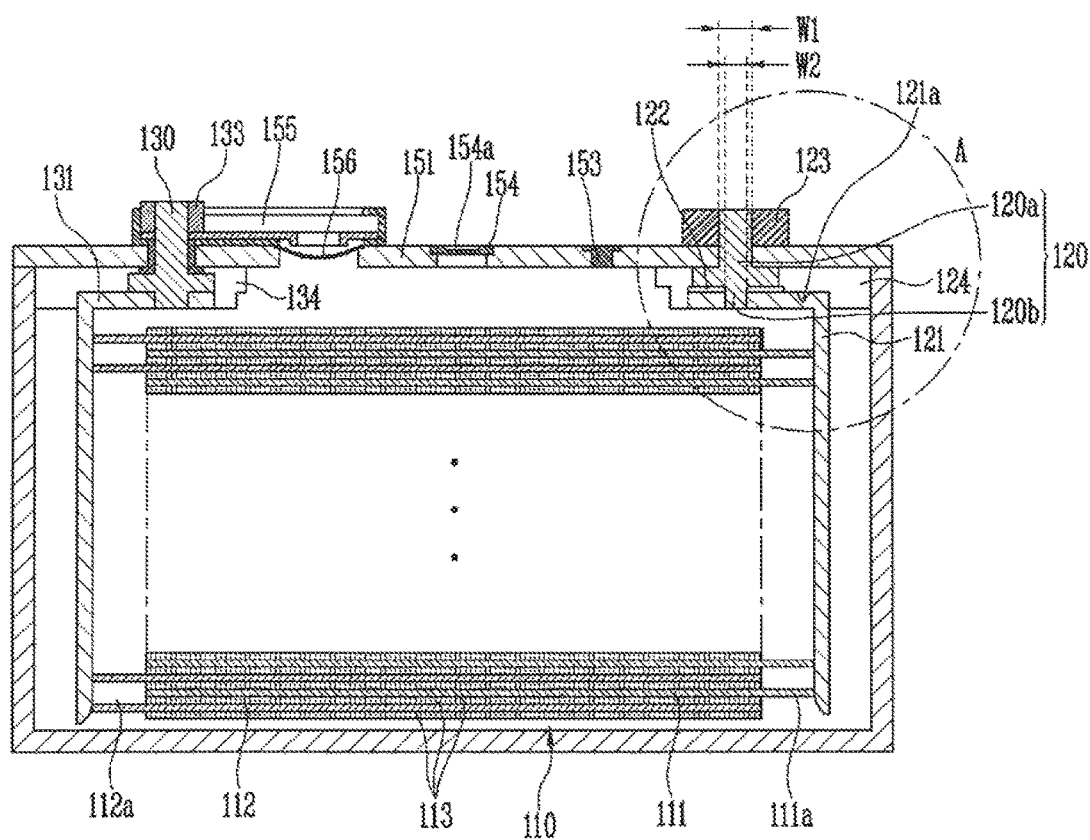
FIG. 2 is a sectional view of the secondary battery of FIG. 1, taken along the line I-I'.

FIG. 1 is a perspective view of a secondary battery 100 according to an embodiment of the present invention; and FIG. 2 is a sectional view of the secondary battery 100, taken along the line I-I' of FIG. 1.

As shown in FIGS. 1 and 2, the secondary battery 100 according to an embodiment of the present invention includes an electrode assembly 110 grid a cap assembly 150. The electrode assembly 110 is provided with first and second non-coating portions 111a and 112a. The cap assembly 150 is provided with first and second current collectors 121 and 131 that are connected to the first and second non-coating portions 111a and 112a, respectively, and first and second terminal connection members 120 and 130 that are connected to portions (e.g., predetermined portions) of the first and second current collectors 121 and 131, respectively. Either of the first and second terminal connection members 120 and 130 includes a fuse.

In one embodiment, the first terminal connection member 120 may include a first area 120a, and a second area 120b extending from the first area 120a, and the fuse may be provided on the second area 120b. The fuse may be molten by heat when there is a short circuit to separate the second area 120b from the first area 120a and thereby interrupt a flow of current. In this case, pressure is increased due to generated gas. While this pressure causes the second area 120b to be spaced apart from the first area 120a, the first current collector 121 connected to the second area 120b may be bent and broken.

The electrode assembly 110, in one embodiment, may be manufactured in the form of a jelly roll by winding a first pole plate 111, a second pole plate 112, and a separator 113 that are stacked on one another, or, in another embodiment, may be manufactured in the form of a stack by stacking a plurality of first pole plates 111, second pole plates 112, and separators 113 or in another embodiment, may be manufactured by both winding and stacking.

The first pole plate 111 includes a first active-material coating portion which is formed by coating a first active material on a first base material that is a sheet-shaped conductive material, and the first non-coating portion 111a which is not coated with the first active material such that the first base material is exposed. The first non-coating portion 111a may protrude at a side of the first pole plate 111. In one embodiment, for example, the first pole plate 111 may be a positive pole plate, and the first active material may comprise an active positive pole material containing lithium, such as $LiCoO_2$, $LiMnO_2$, $LiMn_2O_4$ or $LiNi_{1-x-y}Co_xM_yO_2$.

The second pole plate 112 has a polarity that is different from that of the first pole plate 111, and includes a second active-material coating portion which is formed by coating a second active material on a second base material that is a sheet-shaped conductive material, and the second non-coating portion 112a which is not coated with the second active material such that the second base material is exposed. The second non-coating portion 112a may protrude at a side of the second pole plate 112. In one embodiment, for example, the second pole plate 112 may be a negative plate, and the second active material may be an active negative pole material containing a carbon material, such as crystalline carbon, amorphous carbon, carbon composite, and carbon fiber, lithium metal or lithium alloy.

The separator 113 is interposed between the first pole plate 111 and the second pole plate 112, and insulates the first pole plate 111 and the second pole plate 112 from each other. Further, the separator 113 allows the first pole plate 111 and the second pole plate 112 to exchange lithium ions. The separator 113, in one embodiment, has a length sufficient to completely insulate the first and second pole plates 111 and 112 from each other, even if the electrode assembly 110 contracts and expands.

In one embodiment, the first base material of the first pole plate 111 may contain aluminum, and the second base material of the second pole plate 112 may contain copper. The first and second pole plates 111 and 112 discharge ions into an electrolyte to induce a flow of current or electrons. The current or electrons are transmitted to the outside through the first and second non-coating portions 111a and 112a. In one embodiment the first non-coating portion 111a may be positive pole, and the second non-coating portion 112a may be a negative pole.

The electrode assembly 110 may be housed in a case 140 which may be formed in the shape of a box and which is open at a surface thereof to accommodate the electrode assembly 110 and the electrolyte therein, the opening being dosed by the cap assembly 150. Although in one embodiment, as shown in FIG. 1, the case 140 may have the shape of a box, in other embodiments, the case 140 may be manufactured to have the shape of a cylinder, a pouch, a coin, or another suitable shape.

The cap assembly 150, in one embodiment, includes a cap plate 151 that is configured to close the opening of the case 140, the first and second current collectors 121 and 131 that are connected to the first and second non-coating portions 111a and 112a respectively, the first and second terminal connection members 120 and 130 that are connected to portions (e.g., predetermined portions) of the first and second current collectors 121 and 131, and first and second terminal plates 123 and 133 that are coupled to the first and second terminal connection members 120 and 130. In one embodiment, a sealing member 122 may be further provided between the first current collector 121 and the first terminal, connection member 120. In one embodiment, although not shown in the drawings, a sealing member may be provided between the second current collector 131 and the second terminal connection member 130.

The cap plate 151 is formed to have a size and a shape corresponding to those of the opening of the case 140. The cap plate 151 may include a vent plate 154 having a vent hole and a notch 154a to allow the vent plate 154 to be opened at a certain pressure (e.g., a predetermined pressure), an electrolyte inlet port 153 through which the electrolyte may be injected, and a deformable plate 156. Insulation members 124, 134, and 155 may be provided on the top and bottom of the cap plate 151.

The first and second terminal plates 123 and 133 may be electrically connected to the first and second non-coating portions 111a and 112a, respectively, through the first and second terminal connection members 120 and 130 that are joined to the portions (e.g., predetermined portions) of the first and second current collectors 121 and 131. In one embodiment the first terminal plate 123 may be a positive pole, and the second terminal plate 133 may be a negative pole.

Figure 3:
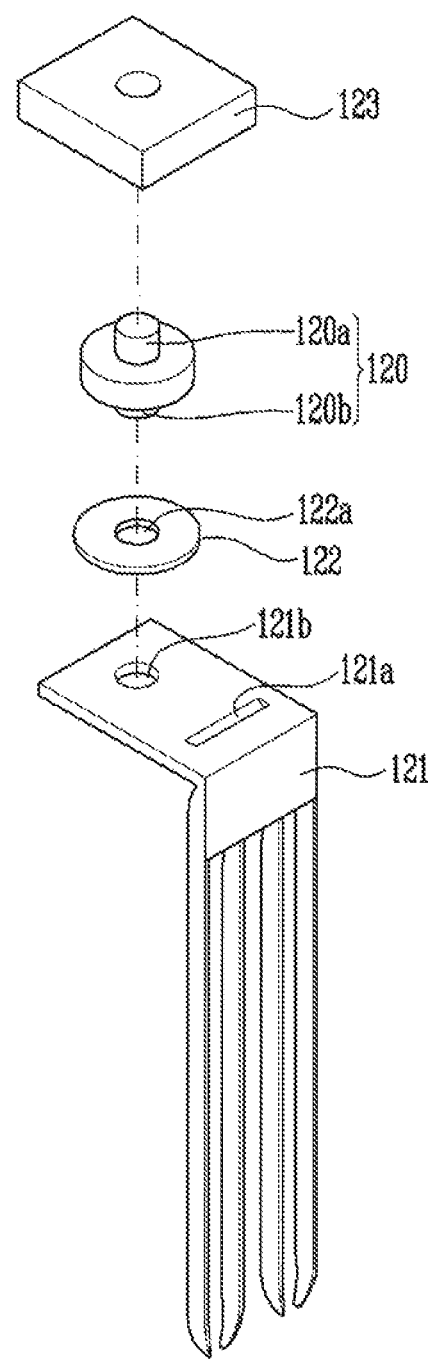
FIG. 3 is an exploded perspective view of a portion of the secondary battery shown in region "A" of FIG. 2.

FIG. 3 is an exploded perspective view of a portion of the secondary battery 100 shown in region "A" of FIG. 2.

As shown in FIG. 3, the first terminal connection member 120 includes the first area 120a and the second area 120b extending from the first area 120a, and the fuse may be provided on the second area 120b. The fuse may be molten by heat when there is a short circuit, thus separating the second area 120b from the first area 120a and thereby interrupting the flow of current. In one embodiment, a width W2 of the second area 120b having the fuse may be narrower than a width W1 of the first area 120a (see FIG. 2) such that the fuse is molten by the heat generated due to the short circuit. The width W2 of the second area 120b may be 1 mm to 5 mm and, in one embodiment, is 3 mm.

An end of the second area 120b may be connected to the first current collector 121, and the sealing member 122 may be electrically insulative and provided between the first terminal connection member 120 and the first current collector 121 such that a current is applied to only the fuse of the second area 120b. In one embodiment a first hole 122a is formed at a position (e.g., a predetermined position) on the sealing member 122, and a first depression 121b is formed at a position on the first current collector 121 in such a way as to correspond to the first hole 122a, such that the first hole 122a and the first depression may be connected to each other via the second area 120b when the first hole 122a is aligned with the first depression 121b in a line in a vertical direction. In this case, the end of the second area 120b may pass through the first hole 122a and be inserted in the first depression 121b, and the end of the second area 120b and the first depression 121b may be coupled to each other by welding (e.g., laser welding).

In one embodiment, the secondary battery 100 generates a high current, and the first current collector 121 may have a robust structure of a strength (e.g., a predetermined strength) to allow the high current to stably flow. That is, the first current collector 121 may have a predetermined strength, and the notch 121a may be formed at a position (e.g., a predetermined position) of the first current collector 121, such that the first current collector 121 may be bent and broken by external pressure. In one embodiment, the notch 121a may be formed to have a depth of 0.3 mm to 0.7 mm, and, in one embodiment, has a depth of 0.5 mm such that the first current collector 121 is easily bent and broken by the pressure of gas that is generated while the fuse is molten in the event of a short circuit. If the depth of the notch 121a is less than 0.3 mm, it is difficult for the first current collector 121 to be bent and broken by the pressure of gas that is generated due to the melting of the fuse, and the arc may be continuously generated such that the battery may be damaged. On the other hand, if the depth of the notch 121a is greater than 0.7 mm, the first current collector 121 may be unexpectedly bent and broken due to the weight of the first terminal connection member 120 and peripheral members. Thus, in one or more embodiments, the depth of the notch 121a is from 0.3 mm to 0.7 mm.

As described above, the first current collector 121, in one embodiment, may be made of aluminum or an aluminum alloy to have a strength (e.g., a predetermined strength), and the notch 121a having the depth of 0.3 mm to 0.7 mm may be formed on the first current collector 121 such that the first current collector 121 may be bent and broken. When a short circuit occurs in the secondary battery 100, the fuse is molten, such that the second area 120b is separated from the first area 120a. When the second area 120b is spaced apart from the first area 120a by the pressure of the gas that is generated when the fuse is molten, the first current collector 121 may be caused to bend. If pressure acting on the first current collector 121 exceeds a certain pressure e.g., a predetermined pressure), the first current collector 121 may be broken. As such, the second area 120b is spaced apart from the first area 120a, and an arc is not generated. Therefore, the safety of the battery is improved.

Figure 4:
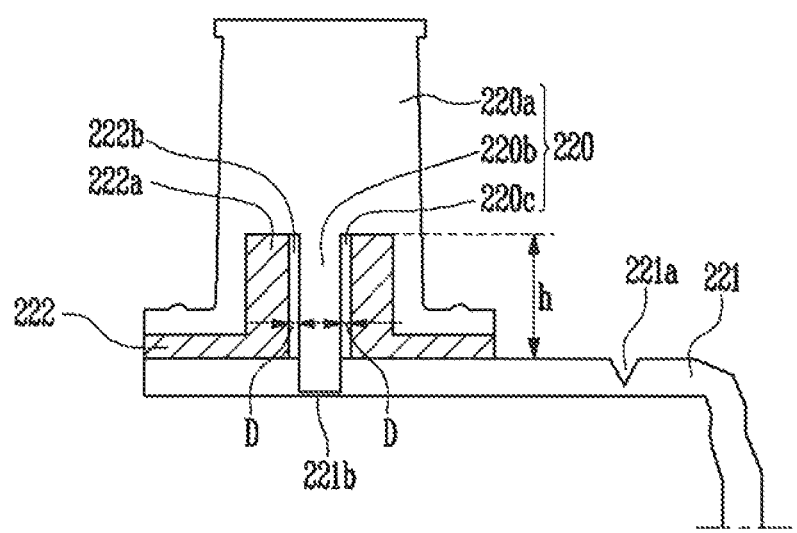
FIG. 4 is a sectional view of a portion of a secondary battery, according to another embodiment of the present invention.
Figure 5:
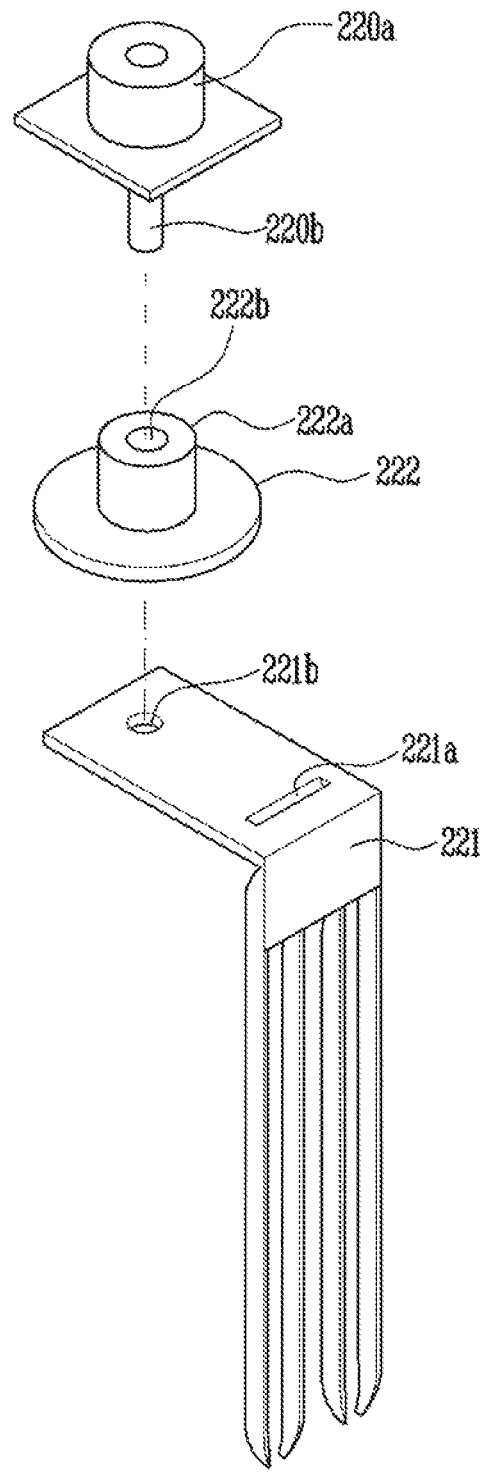
FIG. 5 is an exploded perspective view of the portion of secondary battery of FIG. 4.

FIG. 4 is a sectional view of a portion of a secondary battery, according to another embodiment of the present invention; and FIG. 5 is an exploded perspective view of the portion of the secondary battery of FIG. 4.

As shown in FIGS. 4 and 5, a first terminal connection member 220 according to another embodiment of the present invention includes a first area 220a and a second area 220b extending from the first area 220a, and a fastening hole 220c is formed between the first area 220a and the second area 220b. Here, a width of the second area 220b may be narrower than that of the first area 220a, and the width of the second area 220b may be 1 mm to 5 mm, and, in one embodiment, is 3 mm.

An end of the second area 220b may be connected to a first current collector 221, and a sealing member 222 may be electrically insulative and provided between the first terminal connection member 220 and the first current collector 221 such that a current is applied to only the fuse of the second area 220b. In one embodiment, a protrusion 222a having a second hole 222b is formed at a position (e.g., a predetermined position) on the sealing member 222, and a second depression 221b is formed at a position on the first current collector 221 in such a way as to correspond to the second hole 222b. When the second hole 222b is aligned with the second depression 221b in a line in a vertical direction, the second hole 222b and the second depression 221b may be connected to each other via the second area 220b. In this case, the end of the second area 220b passes through the second hole 222b, the protrusion 222a is inserted in the fastening hole 220c, and the second area 220b passing through the second hole 222b is inserted in and coupled to the second depression 221. Here, the end of the second area 220b and the second depression 221b may be firmly coupled to each other by welding (e.g., laser welding).

In one embodiment, a height "h" of the protrusion 222a is 3 mm to 7 mm, and in one embodiment, is 5 mm, such that the second area 220b may be inserted into the second hole 222b and may reach the second depression 221b. In one embodiment, a width of the second hole 222b may be larger than that of the second area 220b to allow the pressure of gas generated due to the melting of the fuse to be increased. In one embodiment, when the second area 220b is inserted into the second hole 222b, a gap D is formed between an inner wall of the protrusion 222a defining the second hole 222b and the second area 220b. In one embodiment, the gap is 0.3 mm to 0.7 mm, and, in one embodiment, is 0.5 mm. Thus, in the event of a short circuit, the first current collector 221 may be bent and broken by the pressure of the gas that is generated when the fuse is molten.

Figure 6:
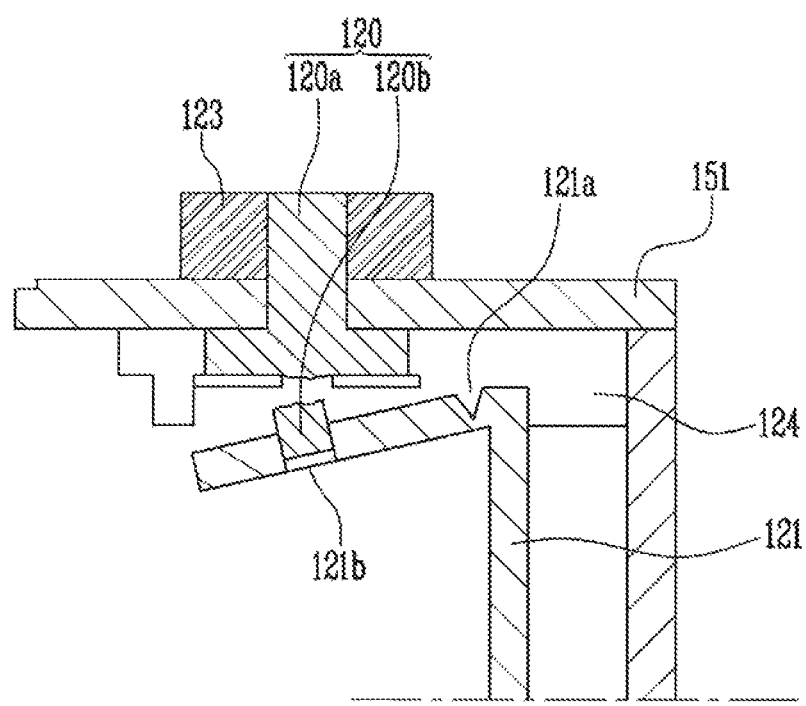
FIG. 6 is a sectional view of a portion of a secondary battery showing an operation of the secondary battery, according to an embodiment of the present invention.

FIG. 6 is a sectional view of a portion of a secondary battery showing an operation of the secondary battery, according to an embodiment of the present invention.

As shown in FIG. 6, a secondary battery according to an embodiment of the present invention is operated as follows. If a short circuit occurs in the case, the fuse formed on the first terminal connection member 120 is molten, such that the second area 120b is separated from the first area 120a. In this case, while the second area 120b is spaced apart from the first area 120a by the pressure of the gas that is generated when the fuse is molten, the first current collector 121 may be broken. Therefore, the second area 120b may be removed from the first area 120a, thus preventing or substantially preventing an arc from occurring and thereby improving safety.

While some exemplary embodiments of the present invention have been disclosed herein, and although specific terms are employed, they are used and are to be interpreted in a generic and descriptive sense only and not for purposes of limitation. In some instances, as would be apparent to one of ordinary skill in the art, features, characteristics, and/or elements described in connection with a particular embodiment may be used in combination with features, characteristics, and/or elements described in connection with other embodiments, unless otherwise specifically indicated. Accordingly, it will be understood by those of skill in the art that various changes in form and details may be made without departing from the spirit and scope of the present invention as set forth in the following claims and equivalents thereof.

What is claimed is:

1. A secondary battery comprising:
an electrode assembly comprising first and second non-coating portions;
a first current collector connected to the first non-coating portion, and a second current collector connected to the second non-coating portion; and
a cap assembly comprising a first terminal connection member connected to a first portion of the first current collector, and a second terminal connection member connected to a portion of the second current collector, wherein the first terminal connection member is connected to the first portion in an opening of the first current collector and the opening is closed between an upper surface of the first portion and a lower surface of the first portion opposite the upper surface,
wherein the first terminal connection member comprises a fuse, and the first current collector has a notch at a position between the first non-coating portion and the first portion of the first current collector, and wherein, in a short circuit state, the first terminal connection member is configured to melt and break a connection at the fuse before a connection is broken at the notch.

2. The secondary battery of claim 1, wherein the first terminal connection member is a positive pole, and the second terminal connection member is a negative pole.

3. The secondary battery of claim 1, wherein a depth of the notch is 0.3 mm to 0.7 mm.

4. The secondary battery of claim 1, wherein the first terminal connection member comprises:
a first area on an upper portion of the cap assembly; and
a second area on a lower portion of the cap assembly.

5. The secondary battery of claim 4, wherein a width of the second area is narrower than a width of the first area.

6. The secondary battery of claim 5, wherein the width of the second area is 1 mm to 5 mm.

7. The secondary battery of claim 4, wherein the fuse is formed on the second area.

8. The secondary battery of claim 4, further comprising:
a sealing member between the first current collector and the first terminal connection member,
wherein a first hole is formed at a position on the sealing member, and the opening of the first current collector is a first depression formed at a position on the first current collector corresponding to the first hole.

9. The secondary battery of claim 8, wherein the first hole is aligned with the first depression, and the second area passes through the first hole and is connected to the first current collector in the first depression.

10. The secondary battery of claim 9, wherein the first current collector and an end of the second area are coupled to each other by laser welding.

11. The secondary battery of claim 4, wherein the first terminal connection member has a fastening hole between the first area and the second area.

12. The secondary battery of claim 11, further comprising:
a sealing member between the first current collector and the first terminal connection member,
wherein the sealing member comprises a protrusion having a second hole, and the opening of the first current collector is a second depression formed at a position on the first current collector corresponding to the second hole.

13. The secondary battery of claim 12, wherein a height of the protrusion is 3 mm to 7 mm.

14. A secondary battery comprising:
an electrode assembly comprising first and second non-coating portions;
a first current collector connected to the first non-coating portion, and a second current collector connected to the second non-coating portion;
a cap assembly comprising a first terminal connection member connected to a portion of the first current collector, and a second terminal connection member connected to a portion of the second current collector; and
a sealing member between the first current collector and the first terminal connection member,
wherein a terminal connection member of the first and second terminal connection members comprises a fuse,
wherein the first terminal connection member comprises:
a first area on an upper portion of the cap assembly; and
a second area on a lower portion of the cap assembly, wherein the first terminal connection member has a fastening hole between the first area and the second area, wherein the sealing member comprises a protrusion having a second hole, and a second depression is formed at a position on the first current collector corresponding to the second hole, wherein the second hole is aligned with the second depression, and the second area passes through the second hole and is connected to the first current collector in the second depression, the protrusion of the sealing member being inserted into and coupled to the fastening hole.

15. The secondary battery of claim 14, wherein a width of the second hole is greater than a width of the second area.

16. The secondary battery of claim 14, wherein a gap between the second area and an inner surface of the protrusion defining the second hole is 0.3 mm to 0.7 mm.

\* \* \* \* \*